(12) United States Patent
Caprera

(10) Patent No.: US 7,363,941 B2
(45) Date of Patent: Apr. 29, 2008

(54) FLUID CONTROL VALVE DEVICE

(75) Inventor: Brian J. Caprera, Warwick, RI (US)

(73) Assignee: Dresser, Inc., Addison, TX (US)

( * ) Notice: Subject to any disclaimer, the term of this patent is extended or adjusted under 35 U.S.C. 154(b) by 275 days.

(21) Appl. No.: 11/014,124

(22) Filed: Dec. 16, 2004

(65) Prior Publication Data
US 2006/0130911 A1 Jun. 22, 2006

(51) Int. Cl.
*F16K 1/44* (2006.01)
(52) U.S. Cl. .............................. 137/614.11; 137/625.3; 251/122; 251/368
(58) Field of Classification Search ........... 137/614.11, 137/625.3; 251/318, 120, 121, 122, 368
See application file for complete search history.

(56) References Cited

U.S. PATENT DOCUMENTS

| | | | |
|---|---|---|---|
| 1,123,079 A * | 12/1914 | Bowman et al. | ............ 137/606 |
| 1,384,432 A | 7/1921 | Dempler | |
| 2,117,182 A | 5/1938 | Lewis | |
| 2,963,042 A * | 12/1960 | Dolby et al. | ................. 137/628 |
| 2,981,514 A | 4/1961 | Loxham | |
| 3,187,775 A | 6/1965 | Pinnell | |
| 3,305,207 A | 2/1967 | Calderoni et al. | |
| 3,450,385 A | 6/1969 | Paptzun | |
| 3,458,170 A | 7/1969 | Vogeli | |
| 4,078,582 A | 3/1978 | Hetz et al. | |
| 4,290,581 A | 9/1981 | Moran et al. | |
| 4,634,095 A | 1/1987 | Taylor et al. | |
| 4,638,833 A * | 1/1987 | Wolcott, II | .................. 137/312 |
| 4,687,495 A | 8/1987 | Maddox | |
| 4,732,364 A * | 3/1988 | Seger et al. | ................. 251/368 |
| 4,815,698 A | 3/1989 | Palmer et al. | |
| 5,133,383 A | 7/1992 | King | ........................ 137/625.3 |
| 5,295,662 A | 3/1994 | Yamaji et al. | |
| 5,297,777 A | 3/1994 | Yie et al. | |
| 5,516,079 A | 5/1996 | Baumann et al. | |
| 5,707,041 A | 1/1998 | Bovee et al. | |
| 5,725,198 A | 3/1998 | Jandl et al. | |
| 5,735,501 A | 4/1998 | Maurer et al. | |

(Continued)

FOREIGN PATENT DOCUMENTS

DE 282 049 2/1915

(Continued)

OTHER PUBLICATIONS

European Search Report issued in Application No. EP 05 25 5299, mailed Nov. 23, 2005, 8 pages, Examiner F-B Lanel.

(Continued)

*Primary Examiner*—Kevin Lee
(74) *Attorney, Agent, or Firm*—Fish & Richardson P.C.

(57) ABSTRACT

Certain embodiments of a fluid control valve include one or more ceramic components that operate substantially free of tensile stress concentrations along the control surfaces. In some embodiments, a fluid control valve includes a ceramic plug having a set of longitudinal grooves milled in the cylindrical surface of the plug to define control surfaces. The plug is disposed in an internal longitudinal cavity of the valve body such that the fluid flows over the plug's control surfaces in a direction substantially parallel to the control surfaces. The ceramic plug and other ceramic components may be manufactured using relatively simple machining techniques to reduce the overall production costs.

13 Claims, 5 Drawing Sheets

U.S. PATENT DOCUMENTS

| | | | |
|---|---|---|---|
| 6,375,050 B1* | 4/2002 | Gruson | 222/504 |
| 6,685,167 B2 | 2/2004 | Robison et al. | |
| 7,028,983 B2 | 4/2006 | Ozaki et al. | |
| 2004/0238050 A1 | 12/2004 | Hamblin et al. | |

FOREIGN PATENT DOCUMENTS

| | | |
|---|---|---|
| DE | 28 27 527 | 1/1980 |
| FR | 569 699 | 4/1924 |
| FR | 990 481 | 9/1951 |

OTHER PUBLICATIONS

Fisher NotchFlo DST Trim, Emerson Process Management.

Yarway Turbo-Cascade high pressure control valve, Yarway Corporation (at least as early as Jun. 26, 1975).

Emerson's New Dirty Service Control Valve Trim Advances Performance of Fisher® Valves in High Pressure Liquid Applications, www.emersonprocess.com (Dec. 4, 2002).

Severe Service Team at Fisher Controls, Severe Service Journal, Sep. 2002, Fisher Controls International, Inc.

Valtek ChannelStream Valve, Valtek Control Products, Flowserve.

Control Valves ZK with Radial Stage Nozzle ZK Range 600, Gestra.

Cavitrol III One-, Two-, and Three-Stage Trims, Sep. 2002, Product Bulletin 80.2:030, Emerson Process Management, www.Fisher.com.

Dirty Service Anti-Cavitation Trim (DST), Aug. 2002, Product Bulletin 80.2:021, Emerson Process Management, www.Fisher.com.

Drag® Valves for Boiler Feedpump Recirculation, Control Components Inc.

Copes-Vulcan® Hush® Trim, Mar. 2002, Bulletin 1124, SPX Valves & Controls™.

78200/18200 Series LincolnLog®, Dresser Masoneilan, www.masoneilan.com (Sep. 17, 2002).

* cited by examiner

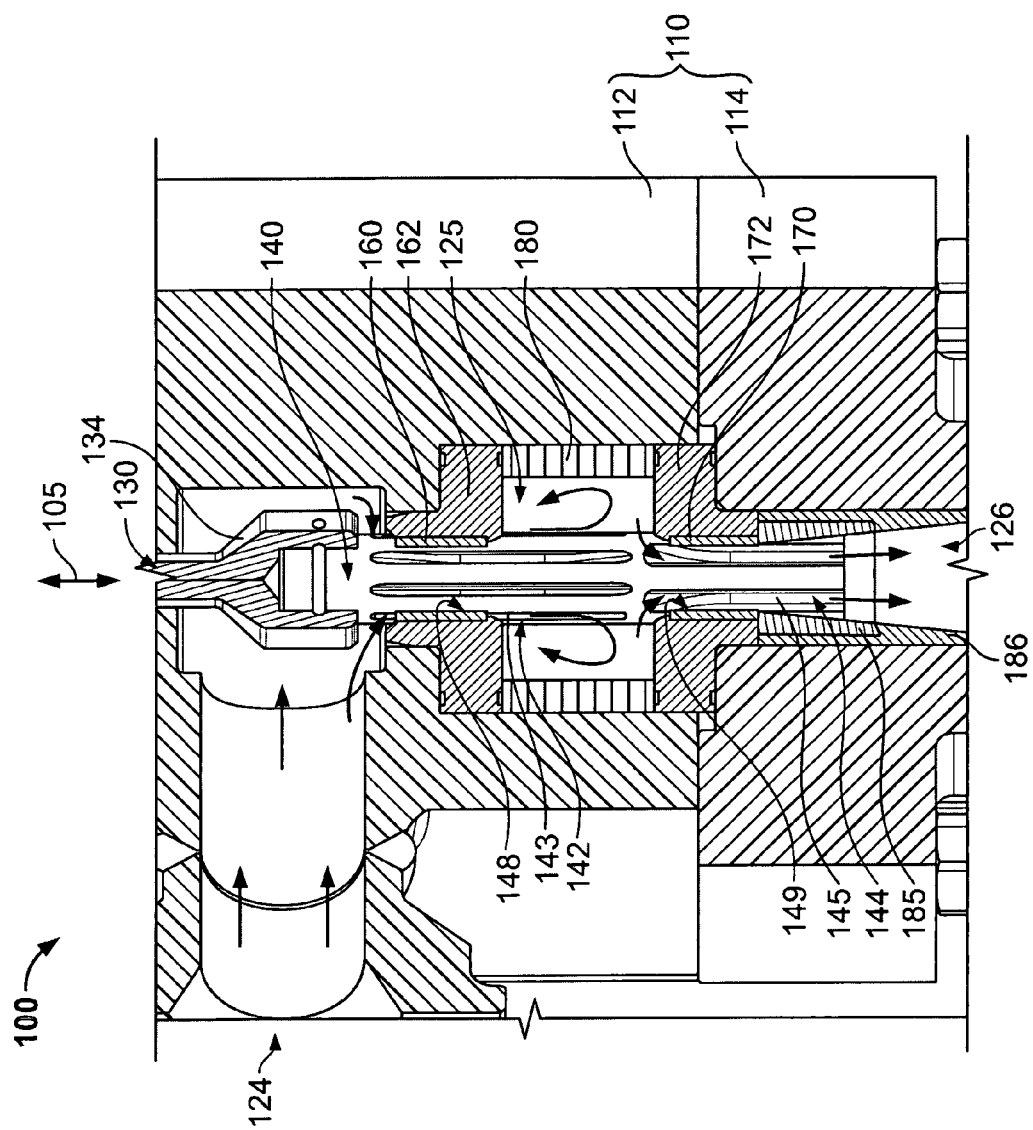

FLUID CONTROL VALVE DEVICE

TECHNICAL FIELD

This invention relates to fluid control devices, and certain embodiments relate to a multi-stage control valve having ceramic components.

BACKGROUND

Some fluid systems use valves to control fluid flow. These fluid control valves may include a plug that is seated inside a valve housing. The plug can be moved within the valve housing to adjust the flow of fluid through the valve. As the fluid flows through the valve, notches or embedded corners on the plug surface interact with the fluid and affect the characteristics of the flow. For example, if a significant pressure drop is applied across the fluid control valve, a double-stage valve may be used to stage the pressure let down as the fluid passes over the plug. In such double-stage valves, the fluid flows over notches or embedded corners formed in the surface of the plug, which guide the fluid into a sequence of recovery cavities in the valve housing.

Several factors affect the design of fluid control valves. The type of fluid that is controlled by the valve may influence the materials and dimensions of the valve components. For example, some gasoline refining applications require valves to control the flow of a high-temperature fluid including crude oil and erosive particulates, such as dirt and/or certain catalytic agents. As this erosive fluid flows through the valve, the components may be subjected to temperatures in excess of 500° F. and in extreme cases in excess of 1000° F. and pressure differential across the valve greater than 3000 psi, which result in high fluid velocities at the control surfaces of the valve. In such instances, a valve plug having specially-dimensioned notches or embedded corners may be used to stage the pressure drop across the valve.

The materials of the valve trim components is another factor to be considered in the design of fluid control valves. The erosion of valve components by high-temperature/high-pressure fluids may lead to significant problems. For example, in some gasoline refining applications, high-temperature crude oil with erosive particulates require replacement of valve plugs made from metal about every six months. Even if the metal can withstand the pressure differentials and tensile stress concentrations imposed at the embedded corners of the valve plug and seat, the erosive fluid can systematically wear away the control surfaces, thereby requiring replacement of the valve components. Rapid erosion of valve components results in significant maintenance and replacement costs.

Other materials may provide better resistance to erosion, but manufacturing costs and operational risks have limited the use of these materials in many commercial applications. In general, manufacturing of metallic valve components is much less costly because machining complex notches and helical threads into metal plugs may be less expensive than machining those same geometries into ceramic plugs. Also, ceramic materials are generally more brittle than metal materials when tensile forces are applied. Because notches, embedded corners, and other complex geometries formed in the surface of the valve plugs may cause tensile stress concentrations in the material, metal components were heretofore believed to be less susceptible to catastrophic failure.

SUMMARY

Certain embodiments of the invention include a fluid control valve having one or more ceramic components that operate substantially free of tensile stress concentrations. In some embodiments, a fluid control valve includes a set of grooves formed on a ceramic plug such that the fluid flows over the plug's control surfaces in a direction substantially parallel to the control surfaces. The ceramic plug and other ceramic components may be manufactured using relatively simple machining techniques to reduce the overall production costs.

In one illustrative embodiment, a multi-stage flow control device includes a ceramic plug to control flow of fluid through a first and second staging portions. The device also includes a first set of control surfaces to contact the fluid in a first staging portion, and a second set of control surfaces to contact the fluid in a second staging portion. The control surfaces are formed in the ceramic plug such that, when the fluid flows through the first and second staging portions, the ceramic plug operates substantially free of tensile stress concentrations along the control surfaces.

In another illustrative embodiment, a flow control device includes a valve body having an internal space and at least one plug guide disposed in the internal space. The device also includes a ceramic plug to control flow of fluid through the internal space. The ceramic plug is slidably engaged with the plug guide so as to reciprocate in a longitudinal direction from a first operative position to a second operative position. The device includes a plurality of grooves formed in an outer surface of the ceramic plug. The grooves extend in the longitudinal direction and define control surfaces such that, when the ceramic plug is in the first operative position, fluid flows in the grooves between the ceramic plug and the plug guide in a direction substantially parallel to the control surfaces.

In yet another illustrative embodiment, a method of manufacturing a valve includes assembling a ceramic plug into an internal space of a valve body. The plug has a plurality of parallel grooves formed in a circumferential surface, and the grooves are spaced apart along the circumferential surface and extend in a substantially longitudinal direction. The method also includes assembling at least one ceramic guide into the internal space of the valve body. The ceramic guide has a substantially cylindrical tunnel to slidably engage the circumferential surface of the ceramic plug. The ceramic plug is slidably engaged with the guide's tunnel to control flow of fluid through the internal space such that, when the ceramic plug is in the first operative position, fluid flows between the ceramic plug and the ceramic guide in a direction substantially parallel to the grooves.

These and other embodiments may be configured to provide one or more of the following advantages. First, a fluid flow control valve having ceramic components may be relatively inexpensive to manufacture. For example, some ceramic components can be manufactured from relatively noncomplex base parts (e.g., cylinders, tubes, and the like) using a minimal number of machining operations. Second, the fluid flow control valve may have an improved resistance to erosive conditions, thereby extending the service life of the valve. In some cases, fluid may flow between the ceramic plug and ceramic guide trim in a direction that is substantially parallel to the control surfaces. Such a configuration may provide a low angle of particle impingement, which can reduce the rate of erosive wear on the ceramic surfaces. Third, the geometry of the ceramic components may be designed to reduce or eliminate tensile stress concentrations during operation of the valve, thereby decreasing the likelihood of catastrophic failure of a valve component. In some instances, the ceramic plug may be configured to include no steps, flanges, or embedded corners that would cause tensile stress concentrations when fluid flows through the valve. Fourth, the flow control valve may be assembled such that the ceramic components experience little or no tensile load during the assembly process. For example, the ceramic components may be held in compression by carriers inside the valve body. Such designs utilize the enhanced toughness of ceramic materials when they are held in compression. One or more of these and other advantages may be provided by the devices described herein.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is another perspective view of the valve of FIG. 2, with a section cut away to provide a view of the internal components.

Like reference symbols in the various drawings indicate like elements.

DETAILED DESCRIPTION OF ILLUSTRATIVE EMBODIMENTS

Figure 1:
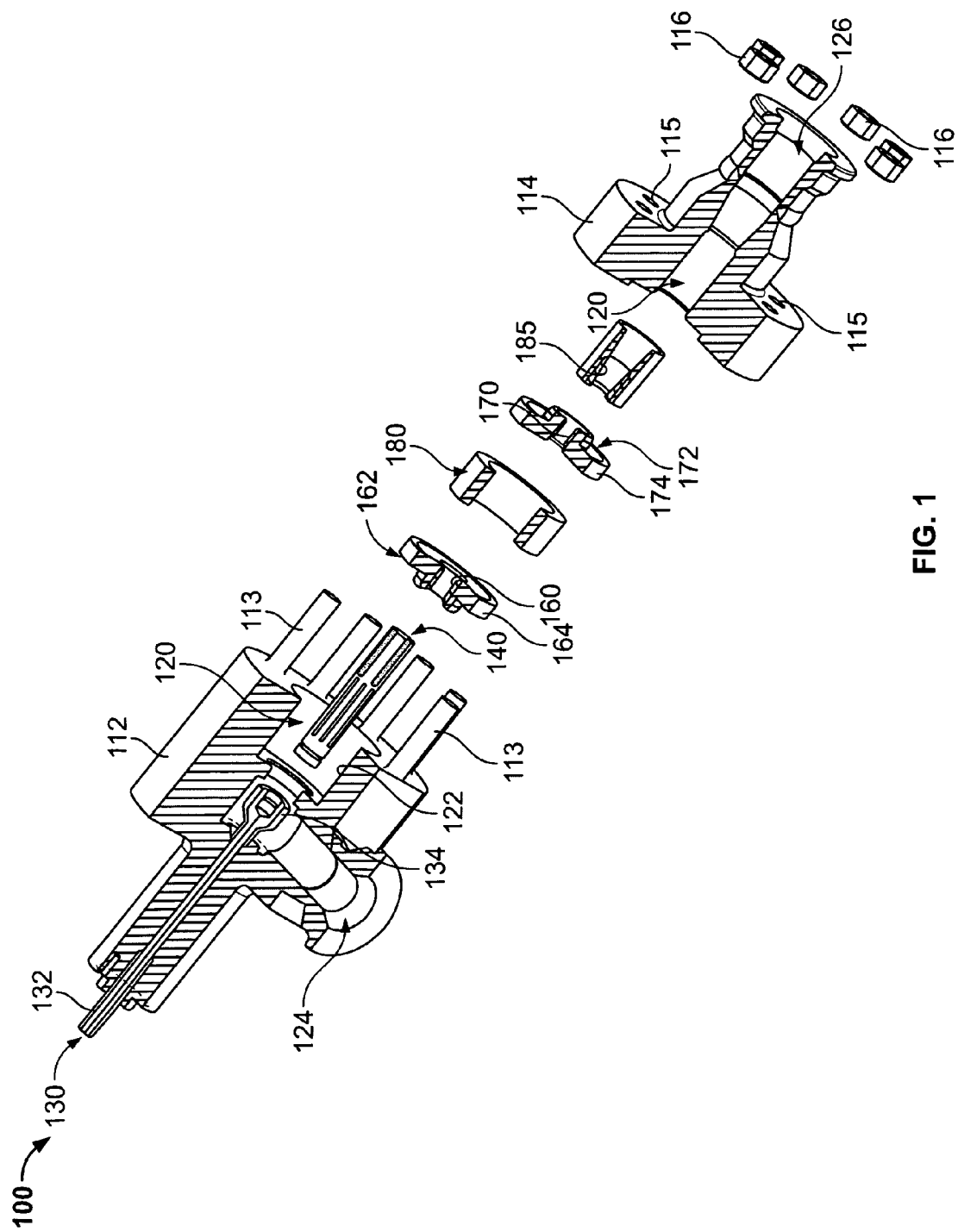
FIG. 1 is a perspective exploded view of a flow control valve in accordance with a certain embodiments of the invention, with a section cut away to provide a view of the internal components.
Figure 2:
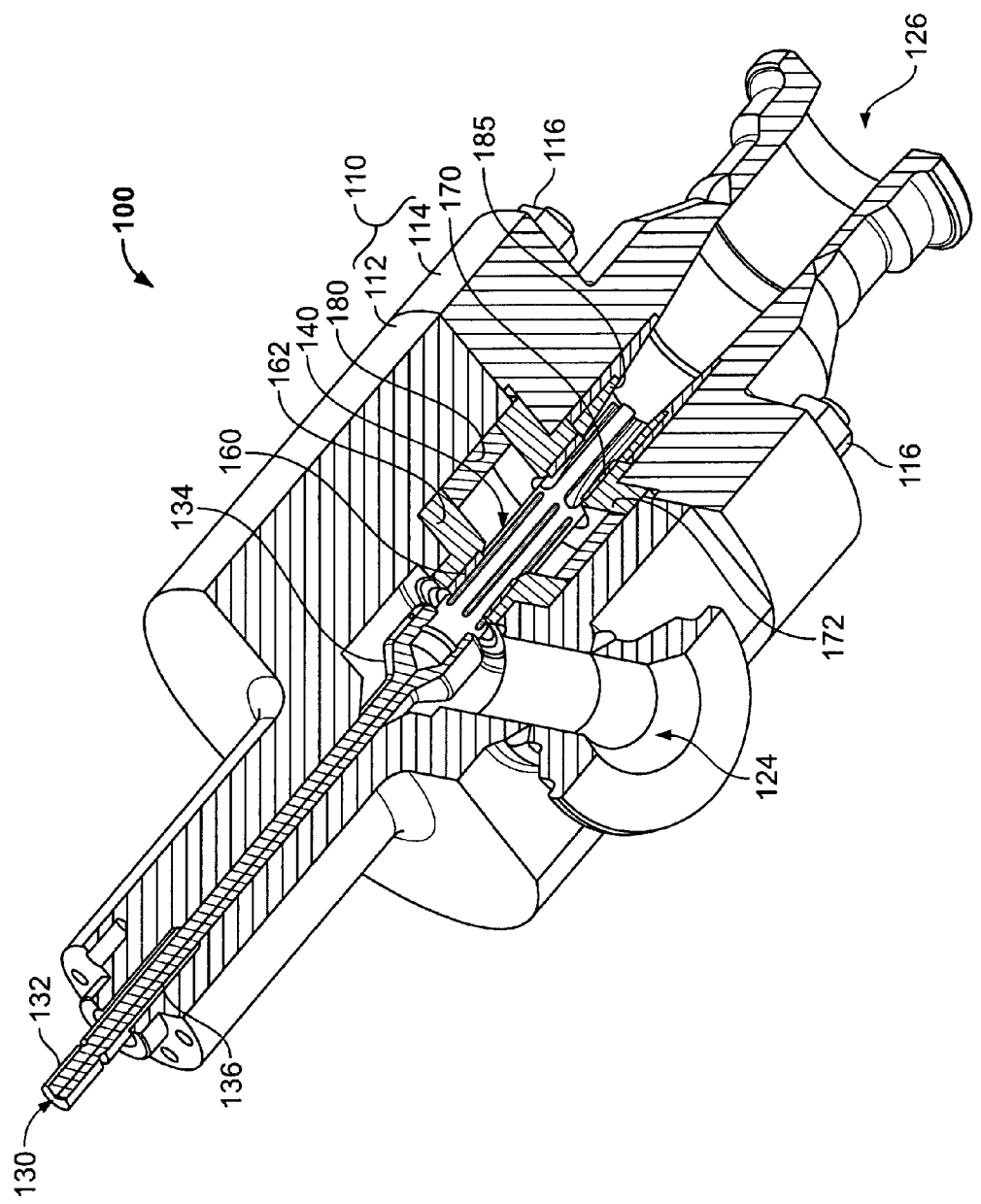
FIG. 2 is an enlarged perspective view of the assembled valve of FIG. 1, with a section cut away to provide a view of the internal components.

Referring to FIGS. 1-2, a valve device 100 includes a valve body 110 that can be assembled from one or more portions. In this embodiment, the valve body comprises an upper body portion 112 and a lower body portion 114. Both body portions 112 and 114 may comprise a high-strength metal material that is capable of withstanding the flow of high-temperature fluids. The upper body portion 112 and the lower body portion 114 are configured to mate with one another when a set of shafts 113 are inserted through a corresponding set of apertures 115 and engaged with a set of threaded nuts 116. Such a configuration provides for proper alignment of the upper and lower body portions 112 and 114. It should be understood that embodiments of the valve body 110 are not limited to the configuration depicted in FIGS. 1-2. Rather, the valve body 110 can be assembled in various ways such that the body portions are properly aligned.

The valve body 110, when fully assembled, includes an internal space 120 in which certain components are disposed. As perhaps best shown in FIG. 1, a stem 130, a plug 140, one or more guides 160 and 170, a spacer 180, and an outlet liner 185 may be disposed in the internal space 120 of the valve device 100. At least an upper portion 132 of the stem 130 may extend out of the valve body 100 so that an actuator or other device may engage the upper stem portion 132. The lower stem portion 134 is disposed in the valve body 110 and engages the plug 140. In such circumstances, the upper stem portion 132 may be adjusted to move the plug 140 relative to the valve body 110.

The plug 140 and/or the guides 160 and 170 may comprise a ceramic material or a similar material that is more brittle than ductile and sufficiently erosion-resistant. In general, ceramic materials perform better under compressive stresses than in conditions where tensile stresses can cause crack propagation and fracture. Also, ceramic materials may be more resistant to erosive fluids when the fluid flows substantially parallel to the ceramic surface (rather than flowing at a high velocity normal to the ceramic surface and impacting the ceramic surface). This erosion resistance characteristic may be more apparent when the fluid is a high-temperature, high-velocity fluid having erosive particulates. Certain embodiments of the flow control valve may utilize one or more of these or other characteristics of ceramic materials to provide a valve device that has a longer operation life and a reduced likelihood of catastrophic failure.

Still referring to FIGS. 1-2, each of the guides 160 and 170 may be retained in an associated carrier 162 and 172, respectively, which are also disposed in the internal space 120. The carriers 162 and 172 may have an outer circumferential surfaces 164 and 174, respectively, that engage a piloting surface 122 of the internal space 120. As such, the guides 160 and 170 can be properly aligned for the plug 140 to extend axially through each of the guides 160 and 170.

The valve body 110 may include at least one input port 124 and at least one output port 126. The input port 124 and output port 126 may be configured to mate with adjoining equipment. For example, the input port 124 or the output port 126 may include internal or external threads to engage a tube, pipe, hose, or port from another piece of equipment. In operation, fluid is communicated through the input port 124 and into the internal space 120. Depending on the position of the plug 140 in the internal space 120, the fluid may pass between the plug 140 and the guides 160 and 170 to the output port 126. Alternatively, the plug 140 may be positioned so that fluid flow is blocked (described in more detail below in connection with FIGS. 4-5). It should be understood that the input port 124 and output port 126 are not limited to the configuration and orientation shown in FIGS. 1-2. Rather, other types and orientations of ports may be used to permit fluid flow into and out of the internal space 120 of the valve body 110.

Figure 3:
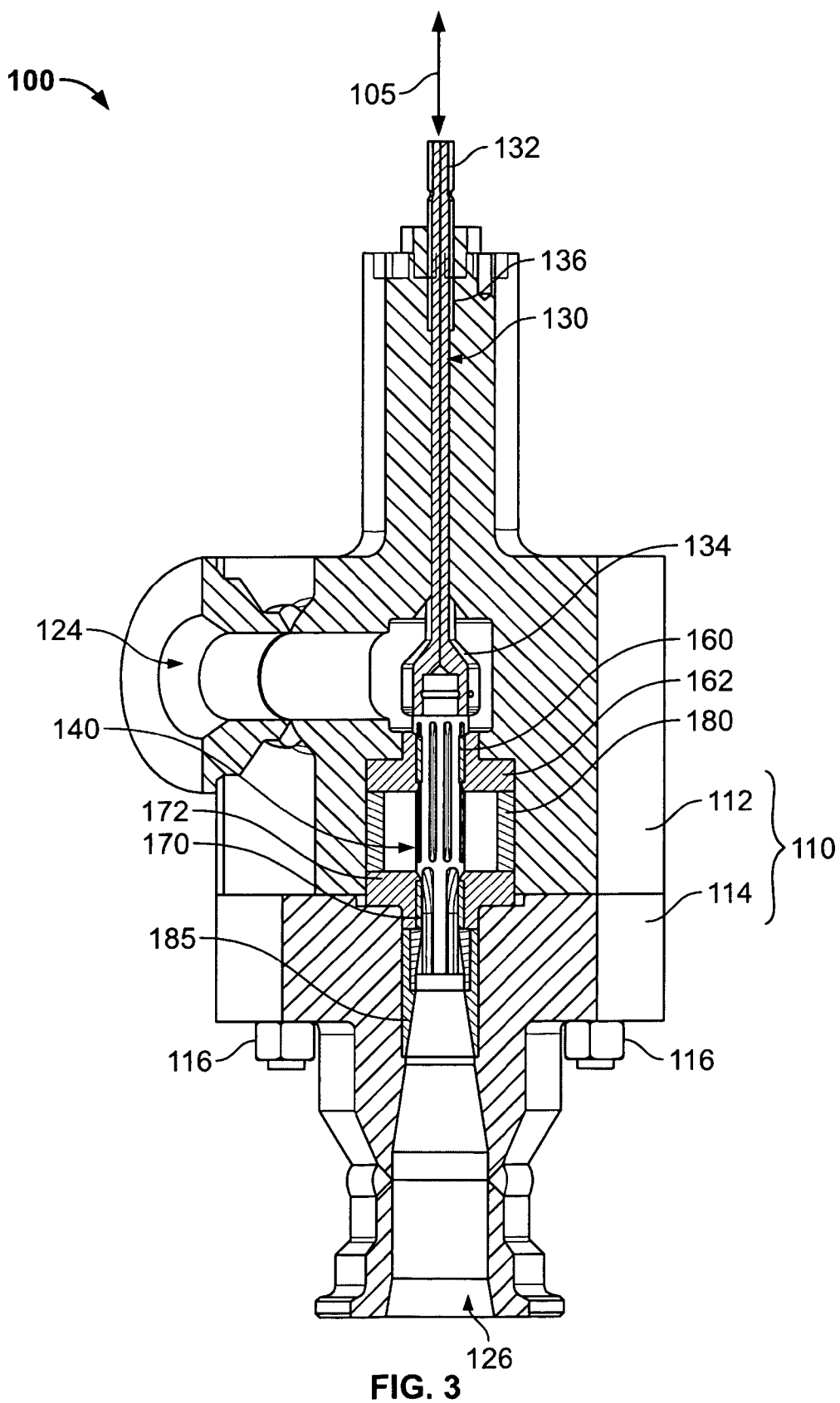
FIG. 3 is another perspective view of the valve of FIG. 2, with a section cut away to provide a view of the internal components.

Referring now to FIG. 3, the stem 130 may include an upper stem guide 136 that engages the outer circumferential surface of the upper stem portion 132. The stem guide 136 may comprise a metal material that is inserted into a bore of the upper valve-body portion 112. The stem guide 136 includes an inner circumferential surface that slidably engages upper stem portion 132 such that the stem 130 may be moved in a longitudinal direction 105 relative to the valve body 110. The stem guide 136 is preferably produced with tight manufacturing tolerances so that the stem 130 is substantially restrained from swaying within the valve body 110. In this embodiment, the stem guide 136 is spaced apart from the plug guides 160 and 170 such that any lateral swaying of the stem 130 proximal the stem guide 136 does not substantially interfere with the position of the of the plug 140 in the guides 160 and 170 (e.g., the manufacturing tolerances of the guides 160 and 170 and the plug 140 substantially prevent any swaying or lateral movement of the stem 130 that might otherwise be permitted by the stem guide 136).

The stem 130 may comprise a metal material that can withstand the flow of high-temperature fluids. In certain embodiments, the stem 130 may comprise a high-strength, hardened steel material. As described in more detail below, some embodiments of the valve device may use the metal surface of the lower stem portion 134 to form a metal-on-metal seat that closes the fluid flow path. The lower stem portion 134 is shaped and configured to engage the plug 140. In addition, the lower stem portion 134 is sized to fit within an internal cavity of the valve body 110 and to move in the longitudinal direction 105 within that cavity.

Figure 4:
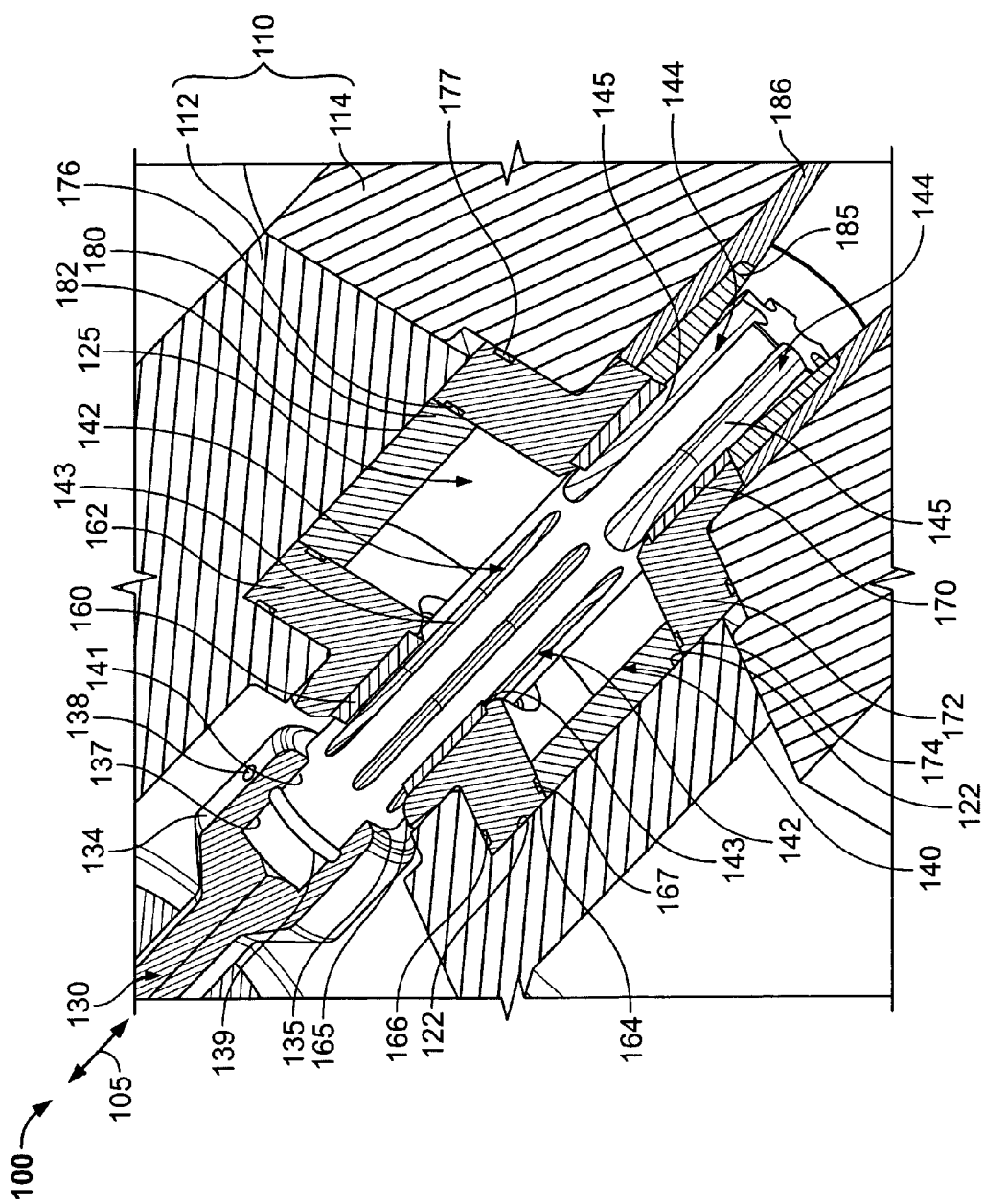
FIG. 4 is an enlarged partial perspective view of a portion of the valve of FIG. 2, with a section cut away to provide a view of the internal components.

Referring to FIG. 4, the lower stem portion 134 may engage the plug 140 such that the plug 140 is retained under compression. In this embodiment, the lower stem portion 134 includes an inner circumferential surface 137 that is engaged with an outer circumferential surface 141 of the plug 140. Such an embodiment permits the lower stem portion 134 to engage the plug 140 with a heat-shrunk compression fit connection. For example, the lower stem portion 134 may be heated (e.g., to a temperature above the estimated operating temperature) to cause expansion of the inner circumferential surface 137. Then the plug 140 may be aligned and inserted into the lower stem portion 134. When the lower stem portion 134 is cooled (e.g., to the estimated operating temperature or below), the lower stem portion 134 contracts forms a compression fit between the inner circumferential surface 137 and the plug 140.

As previously described, the plug 140 may comprise a ceramic material. Because the ceramic material may perform better under compressive conditions, the compression fit engagement between the lower stem portion 134 and the ceramic plug 140 eliminates or reduces any tensile stress concentrations that may be imposed on the ceramic material during assembly.

In some embodiments, a retaining wire may optionally be used as an alternate securing device. The plug's outer circumferential surface 141 and the stem's inner circumferential surface 137 may have opposing grooves formed therein to receive the retaining wire 139. After the plug 140 is secured to the lower stem portion 134 using the compression fit connection, the retaining wire 139 can be inserted through an aperture 138 in the lower stem portion 134 so that the retaining wire 139 is disposed between the lower stem portion 134 and the plug 140. While the compression fit (described above) serves to secure the plug 140 to the stem 130, the retaining wire 139 may serve as an alternate securing device in the event that the lower stem portion 134 heats up and expands to loosen the compression fit.

Still referring to the embodiment depicted in FIG. 4, the ceramic plug 140 includes a first set of grooves 142 formed in the outer circumferential surface 141. In this embodiment, the grooves 142 are substantially parallel to one another and extend in the longitudinal direction 105. Each groove 142 defines one or more control surfaces 143, which are the surfaces that are exposed to the fluid flow along the valve trim where the fluid flow area is pinched (e.g., where the fluid velocity is substantially increased). In this embodiment, the control surfaces 143 include those surfaces in the grooves 142 that are proximal to the ceramic guide 160. When the plug 140 is shifted to an open position, the fluid flows in the grooves 142 (between the plug's control surfaces 143 and the inner surface of the ceramic guide 160) substantially in the longitudinal direction 105. As such, the fluid flows over the control surfaces 143 of the plug 140 in a direction that is substantially parallel to the control surfaces 143 (and the inner surface of the ceramic guide 160). As previously described, ceramic materials may be more erosion resistant when the fluid flows substantially parallel to the ceramic surface. Thus, such embodiments of the ceramic plug 140 may increase the operational life of the valve device 100 while taking advantage of the erosion resistant characteristics of the ceramic material.

In certain embodiments, the valve device 100 may be a multi-staging valve device that stages the pressure drop at different staging portions. As shown in the embodiment in FIG. 4, the plug 140 may include a second set of grooves 144 formed in the outer circumferential surface 141. This second set of grooves 144 may provide a second staging portion in the valve device 100. In this embodiment, the grooves 144 are substantially parallel to one another and extend in the longitudinal direction 105. Each groove 144 defines one or more control surfaces 145, which include those surfaces in the grooves 144 that are proximal to the second ceramic guide 170. When the plug 140 is shifted to an open position, the fluid flows in the grooves 144 (between the plug's control surfaces 145 and the inner surface of the ceramic guide 170) substantially in the longitudinal direction 105 toward the output port 126. Again, the fluid flows over the control surfaces 145 of the plug 140 in a direction that is substantially parallel to the control surfaces 145, which may increase the operational life of the valve device 100 while taking advantage of the erosion resistant characteristics of the ceramic material.

Still referring to FIG. 4, certain embodiments of the ceramic plug 140 may operate substantially free of tensile stress concentrations along the control surfaces of the plug 140. In this embodiment, the fluid does not flow perpendicular to a notched control surface on a plug, thereby causing a tensile stress concentration at the embedded corner of the notch. Rather, the fluid flows in the grooves 142, 144 in a direction substantially parallel to the control surfaces 143, 145 of the plug 140. The ceramic plug 140 operates under compressive forces from the fluid with no substantial tensile stress concentrations. Thus, such embodiments of the valve device 100 may reduce the likelihood of crack propagation and catastrophic failure of the ceramic trim components while taking advantage of the enhanced strength of the ceramic material under compression.

In addition, some embodiments of the ceramic plug 140 may be manufactured using relatively straightforward machining techniques. The ceramic plug 140 may be manufactured without the costly tooling that is often required for ceramic material machining. First, the base part that ultimately forms the plug 140 may be a basic cylinder of ceramic material. Molding and sintering a base shape of such a relatively simple shape is generally less costly than forming a ceramic base part having more complex geometries. Second, the grooves 142 and 144 in the ceramic plug may be formed using relatively noncomplex cuts from a circular saw blade, a grinding disc, or the like. The length and depth of the grooves 142 and 144 may be selected according to the desired flow characteristics of the valve device 100. In any event, the grooves 142 and 144 may be formed without complex machinery that forms annular notches or helical threads in the ceramic material.

Referring now to the guides 160 and 170 depicted in FIG. 4, each guide 160 and 170 is retained by a carrier 162 and 172, respectively. In this embodiment, each carrier comprises a metal material that engages the outer circumferential surface 164 of the associated guide 160 and 170, respectively. Such an embodiment permits each carrier 162 and 172 to engage the associated guide 160 and 170, respectively, with a heat-shrunk compression fit connection. For example, the first carrier 162 is heated (e.g., to a temperature above the estimated operating temperature) to cause expansion. Then the first guide 160 is inserted into the first carrier 162. When the first carrier 162 is cooled (e.g., to the estimated operating temperature or below), the first carrier 162 contracts to forms a compression fit along the outer circumferential surface 164 of the guide 160. A similar process may be performed to retain the second guide 170 in the second carrier.

As previously described, the guides 160 and 170 comprise a ceramic material. Because the ceramic material may perform better under compressive conditions, the compression fit engagement between each carrier 162 and 172 and the associated ceramic guide 160 and 170, respectively, eliminates or reduces any tensile stress concentrations that may be imposed on the ceramic material during assembly. Also, some embodiments of the ceramic guides 160 and 170 may be manufactured using relatively basic machining techniques. First, the base part that ultimately forms the guides 160 and 170 may be a plain cylindrical tube of ceramic material. Molding and sintering a base shape of such a relatively straightforward shape is generally less costly than forming a ceramic base part having more complex geometries. Second, the axial length of the guides 160 and 170 may be properly sized using relatively uncomplicated cuts from a saw blade, a grinding disc, or the like. Thus, the ceramic guides 160 and 170—like the ceramic plug 140—may be relatively inexpensive to manufacture.

Still referring to FIG. 4, the first carrier 162 may be assembled into the internal space 120 (FIG. 1) of the valve body 110 by engaging the outer circumferential surface 164 of the first carrier 162 with the piloting surface 122. In this embodiment, the piloting surface 122 includes a substantially uniform diameter from which the ceramic guides 160 and 170 are aligned. By piloting the first and second carriers 162 and 172 from a single surface, the likelihood of alignment error is substantially reduced (e.g., geometric manufacturing tolerances can be minimized), which may ultimately decrease assembly and quality-control costs. The first carrier 162 may include an upper sealing ring 166 to form a fluid seal between the carrier 162 and the valve body 110. The upper sealing ring 166 may comprise any suitable material that is capable of forming a substantial seal between the adjacent surfaces at the estimated operating temperature and pressure.

This embodiment of the valve device 100 includes a spacer 180 that is assembled into the internal space 120 of the valve body 110. The spacer 180 includes an outer circumferential surface 182 that engages the piloting surface 122 of the upper body portion 112. The spacer 180 has an inner diameter that is substantially larger than the outer diameter of the plug 140. As such, an intermediate cavity 125 is formed in the internal space 120 between the first and second carriers 162 and 172. The intermediate cavity 125 serves as a recovery space for the fluid after being throttled through the first staging portion and before being throttled through the second staging portion (described in more detail below in connection with FIG. 5). The longitudinal length and radial width of the intermediate cavity 125 may be selected according to the desired flow characteristics of the valve device 100. The spacer 180 abuts the first carrier 162 such that an lower sealing ring 167 forms a fluid seal between the carrier 162 and the spacer 180. The lower sealing ring 167 may comprise any suitable material that is capable of forming a substantial seal between the adjacent surfaces at the estimated operating temperature and pressure.

Still referring to FIG. 4, the second carrier 172 may be assembled into the internal space 120 (FIG. 1) of the valve body 110 by engaging the outer circumferential surface 174 of the second carrier 172 with the piloting surface 122. The second carrier 172 may include an upper sealing ring 176 to substantially form a fluid seal between the second carrier 172 and the spacer 180. Similarly, the second carrier 172 includes a lower sealing ring 177 to substantially form a fluid seal between the second carrier 172 and the lower valve body portion 114 (when the valve body 110 is fully assembled).

The outlet liner 185 is also assembled into the internal space 120 of the valve body 110. The outlet liner 185 may comprises a ceramic material that guides the fluid flow as the fluid exits the last set of grooves (e.g., grooves 144) in the plug. The outlet liner 185 may have a frusto-conical inner surface that increases the orifice area for the fluid flow after the fluid passes through the last staging portion. The outlet liner 185 is engaged with a metallic insert 186 by a heat-shrunk compression fit connection. The insert 186 is assembled into the lower valve body portion 114 before the lower valve body portion 114 is mated with the upper valve body portion 112.

When the lower valve body portion 114 is coupled with the upper valve body portion 112, the first carrier 162, the spacer 180, and the second carrier 172 are pressed against one another in the internal space so that each remains in a substantially fixed position relative to the valve body 110. As such, the stem 130 may be moved in the longitudinal direction 105 to adjust the longitudinal position of the plug 140 relative to the guides 160 and 170. If, for example, as shown in FIG. 5, the plug is moved to an open position, the fluid is permitted to flow through the first set of grooves 142, into the intermediate cavity 125, then through the set second set of grooves 144, and toward the output port 126. If, on the other hand, the plug 140 is moved to a closed position, the seat surface 135 of the lower stem portion 134 abuts with the seat surface 165 of the first carrier 162. In one presently preferred embodiment, both the stem 130 and the first carrier 162 comprise a metal material, so the seat surfaces 135 and 165 (see FIG. 4) form a metal-on-metal seat. Thus, the ceramic plug 140 and guides 160 and 170 can be used to resist the effects of an erosive fluid without enduring impact loads at the seat when the plug 140 is moved into the closed position.

Referring now to the valve operation, the valve device 100 may be a single-stage or multi-stage device. In the embodiment shown in FIGS. 1-5, the valve device 100 shown as a double-stage device, but other embodiments may include a valve plug 140 having only one set of grooves 142 or 143 and one guide 160 such that the pressure drop across the valve is staged across only one staging portion. Alternatively, some embodiments may include a valve device having three sets of grooves (142, 144, or the like), three guides (160, 170, or the like), and two intermediate cavities 125 such that the valve device operates as a three-stage device. Similar designs can be implemented to created a valve device having four, five, or more stages.

Referring now to FIG. 5, the valve device 100 may control the fluid flow such that the fluid flows along the control surfaces 143 and 145 in a direction that is substantially parallel to the control surfaces 143 and 145. In addition, the fluid may flow along the valve plug 140 without creating any tensile stress concentrations in the plug 140 or the trim guides 160 and 170. FIG. 5 shows arrows to represent the flow of fluid through the valve device 100. It should be understood that these flow arrows are merely illustrations and do not necessarily represent the actual directions and paths of the fluid flow.

As previously described, the valve device 100 can be closed such that the fluid is not permitted to flow between the input port 124 and the output port 126. In some embodiments, the plug 140 can be moved to a closed position such that the lower stem portion 134 is forced in the longitudinal direction and pressed against the first carrier 162 to form a metal-on-metal seat (described above). When the lower stem portion 134 approaches the first carrier 162 to close the fluid flow, the first set of grooves 142 may have a reduced depth at that point to restrict the flow of fluid. Thus, the flow of fluid through the valve device 100 can be substantially restricted immediately before the lower stem portion 134 contacts the first carrier 162 to close the flow of fluid. Such embodiments may improve the quality of the metal-on-metal seal and may also reduce the erosive wear on the seat surfaces 135 and 165 (FIG. 4).

Still referring to FIG. 5, the valve device can be opened such that the fluid is permitted to flow between the input port 124 and the output port 126. In the embodiment shown in FIG. 5, the stem 130 may be moved in the longitudinal direction 105 relative to the valve body 110 so that at least a portion of the first set of grooves 142 are exposed to the fluid flow from the input port 124. As such, fluid may be throttled through a first staging portion 148, which comprises the plug's control surfaces 143 proximal to first ceramic guide 160. In these circumstances, the fluid flows through the grooves 142 between the control surfaces 143 and the first ceramic guide 160. The grooves 142 guide the fluid so that the fluid flows through the first staging portion 148 substantially in the longitudinal direction and substantially parallel to the control surfaces 143. After throttling through the first staging portion 148, the fluid recovers in the intermediate cavity 125. At least a portion of the second set of grooves 144 are exposed to the fluid in the intermediate cavity 125. When the fluid pressure in the intermediate cavity reaches a sufficient level, the fluid may be throttled through a second staging portion 149, which comprises the plug's control surfaces 145 proximal to second ceramic guide 170. In such circumstances, the fluid flows through the grooves 144 between the control surfaces 145 and the second ceramic guide 170. The grooves 144 guide the fluid so that the fluid flows through the second staging portion 149 in a direction substantially parallel to the control surfaces 145. After throttling through the second staging portion 149, the fluid flows through the outlet liner 185 and toward the output port 126.

The valve device 100 provides the valve designer with at least three ways to characterize the flow of fluid through the valve device 100. First, the flow characteristics through the valve device may be adjusted by changing the longitudinal position of the grooves 142, 144 on the plug 140 relative to the guides 160, 170. Second, the fluid flow characteristics may be adjusted by changing the dimensions of the grooves 142 (e.g., width, depth, and the like) at the first staging portion 148. Third, changing the dimensions of the grooves 144 at the second staging portion 149 may also adjust the flow characteristics through the valve device 100.

It should be understood that the plug's geometries (e.g., grooves 142 and 144) and control surfaces (e.g., surfaces 143 and 145) can have a configuration other than those depicted in FIGS. 4-5. The control surfaces of the plug 140 can be formed to have various appearances depending on the desired flow characteristics. For example, the plug 140 may include a fewer number of larger-sized grooves or a greater number of smaller-sized grooves. In some embodiments, one groove may have different dimensions than an adjacent groove formed in the plug 140.

In the embodiment depicted in FIG. 5, the fluid flows through the staging portions 148 and 149 in a direction that is substantially parallel to the control surfaces 143 and 145. As previously described, ceramic materials may be more erosion resistant when the fluid flows substantially parallel to the ceramic surface. Thus, the operational life of the valve device 100 may be increased while taking advantage of the erosion resistant characteristics of the ceramic material. Also, as the fluid is throttled through each of the staging portions 148 and 149, the ceramic plug 140 and ceramic guides 160 and 170 operate substantially free of any tensile stress concentrations, thereby reducing the likelihood of crack propagation, fracture, and catastrophic failure.

In some presently preferred embodiments, the valve device 100 is configured to be used in refining applications to control the flow of erosive fluid. For example, some refining applications include an erosive fluid that comprises crude oil with erosive particulates (e.g., dirt and/or catalyzing agents). The valve device 100 may control this erosive fluid under conditions where the fluid is heated to a temperature of about 600° F. to about 1,200° F. and the pressure drop across the valve device could be in the range of about 1,000 psi to about 3,500 psi. In such circumstances, the valve device 100 may have an input port size from about 1 to about 8 inches in diameter, and in some embodiments, the input port could be as large as 24 inches in diameter. Furthermore, certain embodiments of the ceramic plug may have a longitudinal length of more than 12 inches, and the internal space of the valve body 110 is sufficiently sized to house such a plug. In these embodiments, the fluid may flow through the staging portions 148 and 149 in a direction that is substantially parallel to the control surfaces 143 and 145 of the ceramic plug 140, which can increase the operational life of the trim components in the valve device 100.

In some alternative embodiments, the plug 140 and the guides 160 and 170 may comprise another construction material that has characteristics similar to ceramic materials. For example, the plug and trim guides may comprise Stellite® material, which is a specially designed alloy supplied by Deloro Stellite, Inc. of Belleville, Ontario. Similar to ceramic materials, Stellite® material (and other such specially designed alloys) are generally more brittle than ductile (e.g., its ultimate compression strength is substantially larger than its ultimate tensile strength), very hard, and sufficiently resistant to erosive fluids. Because the plug and trim guides operate substantially free of any tensile stress concentrations, the likelihood of crack propagation or tensile fracture in the substantially brittle and hard material is reduced.

A number of embodiments of the invention have been described. Nevertheless, it will be understood that various modifications may be made without departing from the spirit and scope of the invention. Accordingly, other embodiments are within the scope of the following claims.

What is claimed is:

1. A multi-stage flow control valve, comprising:
a valve body having an input port, an internal space extending in a longitudinal direction, and an output port;
first and second ceramic guides disposed in the internal space, the second ceramic guide being longitudinally spaced apart from the first ceramic guide to define an intermediate cavity therebetween;
a continuous substantially cylindrical ceramic plug to control flow of fluid through the internal space, the ceramic plug extending in the longitudinal direction and being slidably engaged with the first and second ceramic guides;

a first set of control surfaces formed in an outer circumferential surface of the ceramic plug, the first set of control surfaces being disposed proximal to the first ceramic guide to contact the fluid in a first staging portion between the input port and the intermediate cavity; and a second set of control surfaces formed in outer circumferential surface the ceramic plug, the second set of control surfaces being disposed proximal to the second ceramic guide to contact the fluid in a second staging portion between the intermediate cavity and the output port.

2. The valve of claim 1, wherein, when fluid flows through the first and second staging portions, the fluid flows in a direction that is substantially parallel to the control surfaces.

3. The valve of claim 1, further comprising a first carrier disposed in the internal space and connected to the first ceramic guide, wherein the first ceramic guide is tubular and the first carrier retains the first ceramic guide with a compression fit connection.

4. The valve of claim 1, wherein the control surfaces comprise a plurality of parallel grooves formed in a circumferential surface, the grooves being spaced equi-distance apart and extending in a substantially longitudinal direction.

5. The valve of claim 1, further comprising an actuation member connected to the ceramic plug, wherein the actuation member includes a stem portion that extends from the valve body such that, when the stem portion is moved relative to the valve body, the ceramic plug is moved relative to the ceramic guides.

6. The valve of claim 1, further comprising opposing seat surfaces to close the flow of fluid through the internal space, the seat surfaces comprising a metal material.

7. The valve of claim 6, wherein
when fluid flows through the first and second staging portions, ceramic surfaces of the plug and guides guide the fluid, and
when fluid flow through the internal space is closed, the metal seat surfaces contact one another.

8. The valve of claim 1, wherein the fluid comprises an erosive medium including at least one liquid and at least one erosive particulate.

9. The valve of claim 2, wherein, a pressure drop in the fluid occurs substantially parallel to the control surfaces.

10. A multi-stage flow control device, comprising:
a continuous substantially cylindrical plug to control flow of fluid through a first and second staging portions, wherein the plug comprises a brittle material characterized by an ultimate compression strength that is substantially greater than an ultimate tensile strength;

a first set of control surfaces formed in the brittle material to contact the fluid in a first staging portion;

a second set of control surfaces formed in an outer circumferential surface of the plug to contact the fluid in a second staging portion wherein the control surfaces are formed in the plug such that, the fluid flows through the first and second staging portions;

a valve body having an internal space, the plug being disposed in the internal space;

first and second tubular guides disposed in the internal space, the guides comprising a brittle material characterized by an ultimate compression strength that is substantially greater than an ultimate tensile strength, wherein the plug is slidably engaged with the first and second guides.

11. The valve of claim 10 wherein, a pressure drop in the fluid occurs substantially parallel to the control surfaces.

12. A multi-stage flow control device, comprising:
a continuous substantially cylindrical plug to control flow of fluid through a first and second staging portions, wherein the plug comprises a brittle material characterized by an ultimate compression strength that is substantially greater than an ultimate tensile strength;

a first set of control surfaces formed in an outer circumferential surface of the plug to contact the fluid in a first staging portion;

a second set of control surfaces disposed radially about the plug and formed in the brittle material to contact the fluid in a second staging portion wherein the control surfaces are formed in the plug such that, the fluid flows through the first and second staging portions;

a valve body having an internal space, the plug being disposed in the internal space;

first and second tubular guides disposed in the internal space, the plug being disposed in the internal space, wherein the first set of control surfaces is disposed proximal to the first guide to contact the fluid in the first staging portion, and the second set of control surfaces is disposed proximal to the second guide to contact the fluid in the second staging portion.

13. The valve of claim 12, wherein, a pressure drop in the fluid occurs substantially parallel to the control surfaces.

* * * * *

UNITED STATES PATENT AND TRADEMARK OFFICE
CERTIFICATE OF CORRECTION

PATENT NO.         : 7,363,941 B2                                    Page 1 of 1
APPLICATION NO.    : 11/014124
DATED              : April 29, 2008
INVENTOR(S)        : Caprera It is certified that error appears in the above-identified patent and that said Letters Patent is hereby corrected as shown below:

On the title page,

[*] Notice:    Subject to any disclaimer, the term of this patent is extended or adjusted under 35 USC 154(b) by 275 days Delete the phrase "by 275 days" and insert -- by 265 days --

Signed and Sealed this

Twenty-first Day of July, 2009

JOHN DOLL
*Acting Director of the United States Patent and Trademark Office*